United States Patent [19]

Hayashi et al.

[11] Patent Number: 4,750,755
[45] Date of Patent: Jun. 14, 1988

[54] MOUNTING STRUCTURE OF AN UPPER SUSPENSION ARM AND A MCPHERSON STRUT

[75] Inventors: Bungo Hayashi; Norikazu Furuta, both of Toyota; Atsushi Niimi, Kariya, all of Japan

[73] Assignee: Toyota Jidosha Kabushiki Kaisha, Toyota, Japan

[21] Appl. No.: 860,417

[22] Filed: May 7, 1986

[30] Foreign Application Priority Data

May 7, 1985 [JP] Japan .................. 60-66484[U]

[51] Int. Cl.⁴ .................................... B60G 15/06
[52] U.S. Cl. ......................... 280/668; 280/696
[58] Field of Search ......... 280/666, 668, 667, 670, 280/673, 696, 701; 267/34

[56] References Cited

U.S. PATENT DOCUMENTS

| | | | |
|---|---|---|---|
| 2,197,163 | 4/1940 | Valletta | 267/254 |
| 2,334,597 | 11/1943 | Badertscher | 267/220 |
| 2,888,269 | 5/1959 | Hogsten | 280/701 |
| 3,927,711 | 8/1974 | Muller | 280/666 |
| 3,958,653 | 5/1976 | Arning | 180/157 |
| 4,318,551 | 3/1982 | Shay et al. | 280/696 |
| 4,377,298 | 3/1983 | Finn | 280/696 |
| 4,465,296 | 8/1984 | Shiratori | 280/668 |
| 4,486,028 | 12/1984 | Tanahashi | 280/668 |

FOREIGN PATENT DOCUMENTS

| | | |
|---|---|---|
| 222764 | 7/1959 | Australia . |
| 231602 | 12/1960 | Australia . |
| 235034 | 8/1961 | Australia . |
| 0026131 | 4/1981 | European Pat. Off. . |
| 1071500 | 12/1959 | Fed. Rep. of Germany . |
| 1066007 | 6/1954 | France . |
| 1192063 | 10/1959 | France . |
| 96007 | 6/1984 | Japan . |
| 182407 | 12/1984 | Japan . |

Primary Examiner—John J. Love
Assistant Examiner—Karin L. Ferriter
Attorney, Agent, or Firm—Oblon, Fisher, Spivak, McClelland & Maier

[57] ABSTRACT

A structure for mounting a suspension on a car body in which a shock absorber and an upper arm connected to a steering knuckle and extending inward are supported by a bracket. The bracket is pivotally connected to the upper arm and is connected to the shock absorber. The upper arm and the shock absorber are mounted on the car body via the bracket.

9 Claims, 3 Drawing Sheets

MOUNTING STRUCTURE OF AN UPPER SUSPENSION ARM AND A MCPHERSON STRUT

BACKGROUND OF THE INVENTION

1. Field of the Invention

This invention relates to a mounting structure for a suspension and, more particularly, to a mounting structure for joining an upper portion of a double wishbone type suspension of an automobile with a car body.

2. Description of the Related Art

A double wishbone type suspension is usually provided with an upper arm having a pair of arm portions extending inward from a joining portion having a steering knuckle and being mutually spaced in front and to the rear of each other in the longitudinal direction of the vehicle, as well as a shock absorber and a coil spring surrounding the shock absorber. These parts are mounted on a car body such that the shock absorber and the coil spring are disposed in the space between the arm portions (for example, as shown in Japanese Utility Model Public Disclosure (KOKAI) No. 182407/84).

When such suspension components are to be mounted on the car body, the arm portions of the upper arm are firstly joined with the car body and then the shock absorber and the coil spring are joined with the car body, or the order of mounting these parts is reversed.

In a mounting structure disclosed in Japanese Patent Public Disclosure No. 96007/84, two bolts, each of which has a head with a hole, are extended upwardly through and fixed to a rectangular section attaching portion of a car body. A third bolt is inserted into the holes of the two bolts, a nut is screwed onto the bolt, and an upper arm is connected with the third bolt, and thus to the car body.

The space provided for mounting an upper arm is narrow and is surrounded by a fender, hood, dash panel or the like and further the upper arm must be assembled with high torque so as to be able to withstand the forces applied during travel. As a result, operations necessary for mounting the parts are complicated and the automation of these operations is made difficult.

Also, when the joining of the upper arm precedes the joining of the shock absorber and coil spring or vice versa, the space available for the steps of mounting the following parts may often be restricted, which hinders improvements in productivity.

SUMMARY OF THE INVENTION

An object of the present invention is to eliminate the assembly restrictions arising in joining a shock absorber after or before the joining of an upper arm.

According to the present invention there is provided a structure for mounting a suspension on a vehicle body in which a shock absorber and an upper arm connected to a steering knuckle and extending inward is supported by a bracket pivotally connected to the upper arm and connected to a piston rod of the shock absorber, wherein said upper arm and said shock absorber are mounted on the car body via the bracket.

In a preferred embodiment of the invention, the upper arm has a pair of arm portions extending inward from a joining portion which is connected to the steering knuckle and mutually spaced to the front and rear in the vehicle longitudinal direction. Further, a coil spring is provided to surround the shock absorber. The shock absorber and the coil spring are disposed in a space between the arm portions and the bracket receives an upper end of the coil spring.

Since the upper arm is pivotally joined with the bracket and the piston rod of the shock absorber is also joined with the bracket, these parts can be mounted on the car body by joining the bracket to the car body. Thus, assembly restrictions caused by joining the upper arm before or after the joining of the shock absorber is eliminated to improve assembly, particularly in the preferred embodiment in which many parts are connected to the bracket.

Before the upper arm, shock absorber and coil spring are mounted on the car body, a lower end of the shock absorber and the steering knuckle can be joined with a lower arm, and the lower arm can be pivotally joined with a subframe. A so-called subassembly can thus be constituted in order to permit wheel alignment to be coordinated, so that productivity is improved.

Since the upper arm is joined to the bracket before it is mounted on the car body, automated assembly can be attained so that the joining of the upper arm to the bracket under high torque conditions can be efficiently achieved.

BRIEF DESCRIPTION OF THE DRAWINGS

The other objects and features of the invention will become apparent from the following description of preferred embodiments of the invention with reference to the accompanying drawings, in which.

DESCRIPTION OF THE PREFERRED EMBODIMENTS

Figure 1:
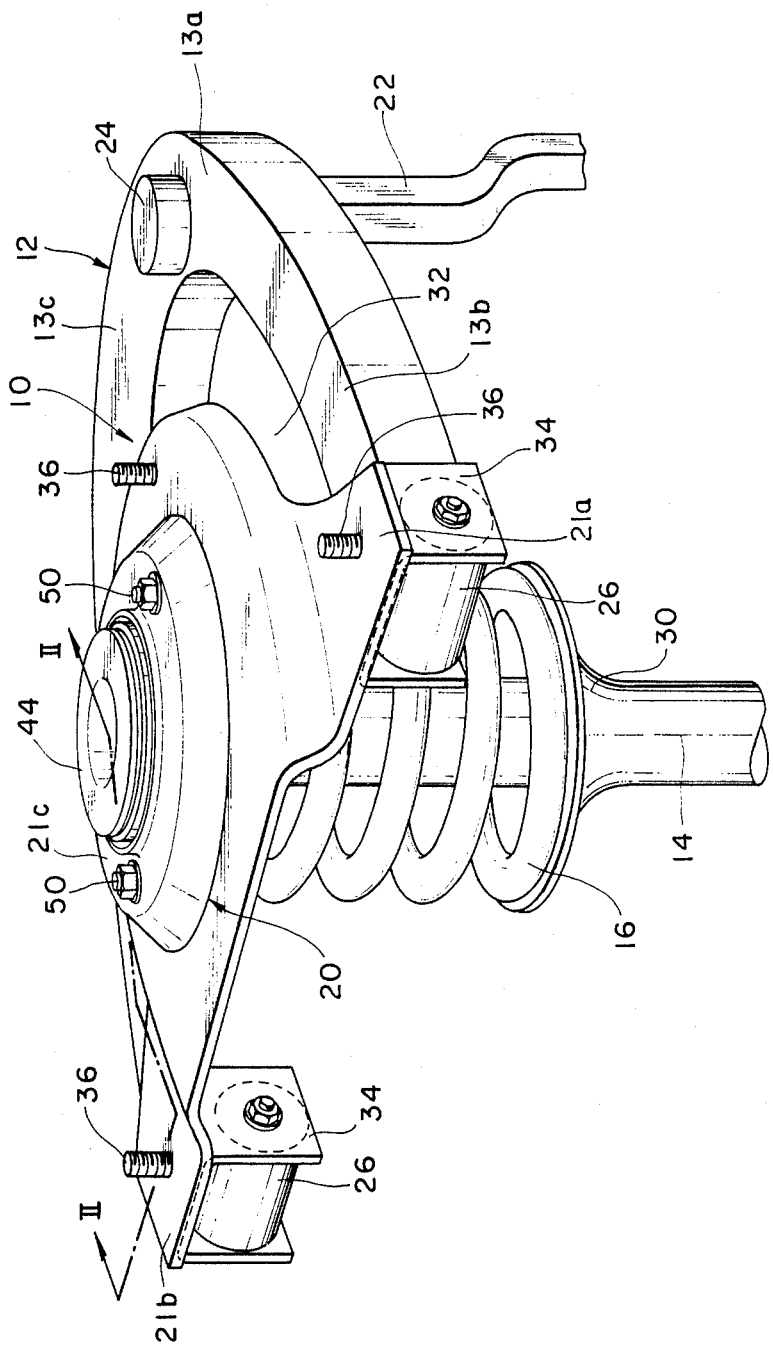
FIG. 1 is a perspective view showing a mounting structure.

As shown in FIG. 1, in a double wishbone type suspension provided with an upper arm 12, a shock absorber 14 and a coil spring 16, a mounting structure 10 for mounting the upper arm 12, shock absorber 14 and coil spring 16 on a car body 18 (FIG. 2) includes a bracket 20.

Figure 2:
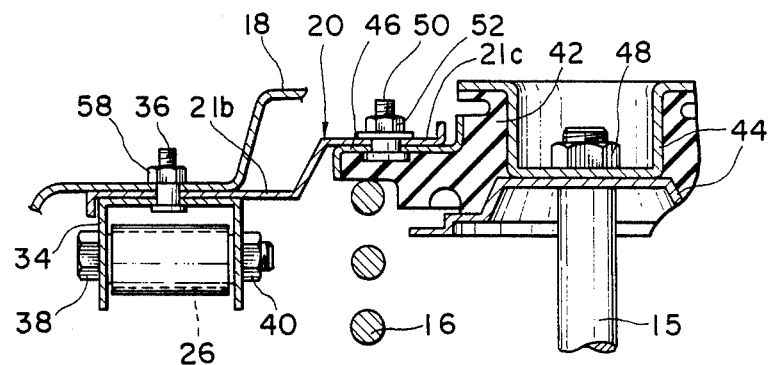
FIG. 2 is a partially sectional view of the mounting structure sectioned along II—II in FIG. 1.

The upper arm 12 is integrally formed with joining portion 13a and a pair of arm portions 13b, 13c extending inward from the joining portion 13a and spaced in front and to the rear of one another in the longitudinal direction of the vehicle. A steering knuckle 22 is joined with the joining portion 13a through a ball joint 24. The pair of arm portions 13b, 13c are respectively provided at their free ends with eyes 26 (FIG. 2).

Figure 3:
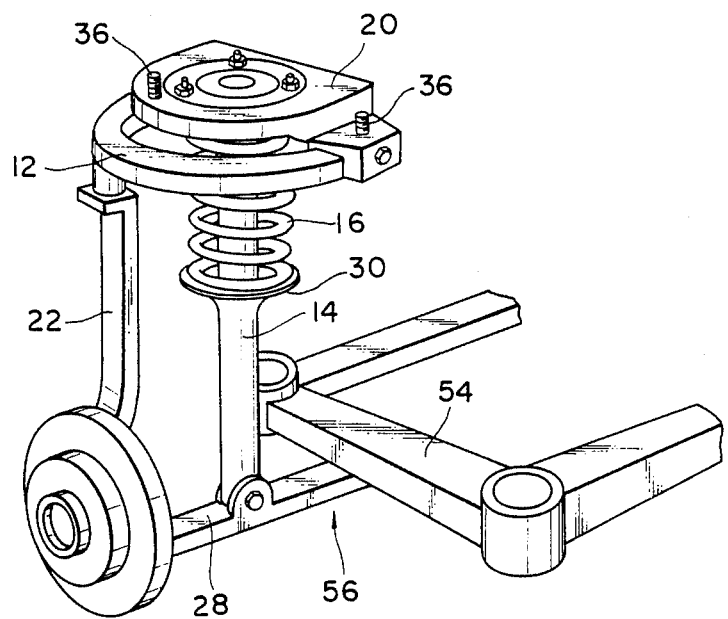
FIG. 3 is a perspective view showing a subassembly.

The shock absorber 14 is a twin tube type or monotube type which is well known, per se. As shown in FIG. 3, the shock absorber 14 has a lower end pivotally joined with a lower arm 28 and an upper end joined with the bracket 20 by a structure which will be later described. The lower arm 28 supports the steering knuckle 22 at an outer end thereof via a ball joint (not shown).

The coil spring 16 is disposed to surround the shock absorber 14 and has a lower end mounted on a spring sheet 30 welded to a cylinder of the shock absorber 14. The shock absorber 14 and the coil spring 16 are disposed in a space 32 between the arm portions 13b, 13c of the upper arm 12.

The bracket 20 has lateral first and second mounting portions 21a, 21b and a central third mounting portion 21c. These mounting portions are press formed of sheet material. The third mounting portion 21c is positioned above the first and second portions 21a, 21b and is formed in a ring-shape.

In the embodiment shown, the bracket 20 has a pair of mounting members 34 fixed respectively to the first and second mounting portions 21a, 21b. Each member 34 has a U-shaped configuration as viewed from the front side. Bolts 36, two of which extend vertically through the mounting member 34, are press fitted in the first and second mounting portions 21a, 21b respectively via serrations thereon or are welded thereto. An additional bolt 36 is centrally mounted on the bracket. The bolts 36 connect the bracket 20 with the car body 18 and two of a plurality of bolts preferably also fix the mounting members 34.

Rubber bushings (not shown) are attached within the respective eyes 26 in arm portions 13b and 13c of the upper arm 12. These eyes are positioned within the mounting members 34, a bolt 38 is inserted through each of the mounting members and bushing, and a nut 40 is threaded onto each bolt, so that the respective arm portions 21a, 21b of the upper arm 12 are pivotally joined with the bracket 20.

A piston rod 15 of the shock absorber 14 and an upper end of the coil spring 16 are connected to the third mounting portion 21c of the bracket 20. In the embodiment shown in FIG. 2, a pair of support plates 44 are bonded to the central portion of a rubber bushing 42 and a support plate 46 is bonded to a peripheral edge of the bushing 42. An end of the piston rod 15 extends through the support plates 44 and a nut 48 is threaded onto said end. On the other hand, a plurality of bolts 50 (two bolts are shown in FIG. 1) are press fitted into the support plate 46 via serrations thereon and extend through the third mounting portion 21c of the bracket 20 and nuts 52 are threaded respectively onto the bolts 50 to join the piston rod 15 with the bracket 20. An upper end of the coil spring 16 bears against the bushing 42.

As shown in FIG. 3, the upper arm 12, shock absorber 14 and coil spring 16 are connected to the bracket 20 and an inner end of the lower arm 28 is pivotally joined with a subframe 54 to constitute a subassembly 56. The wheel alignment can be coordinated with this subassembly 56 before incorporating the subassembly into the car body. The bolts 36 of the bracket 20 extend through the car body 18 and nuts 58 are respectively screwed onto the bolts 36 to join the bracket 20 thereto, thereby joining the subassembly 56, the upper arm 12, shock absorber 14 and coil spring 16 with the car body.

Figure 4:
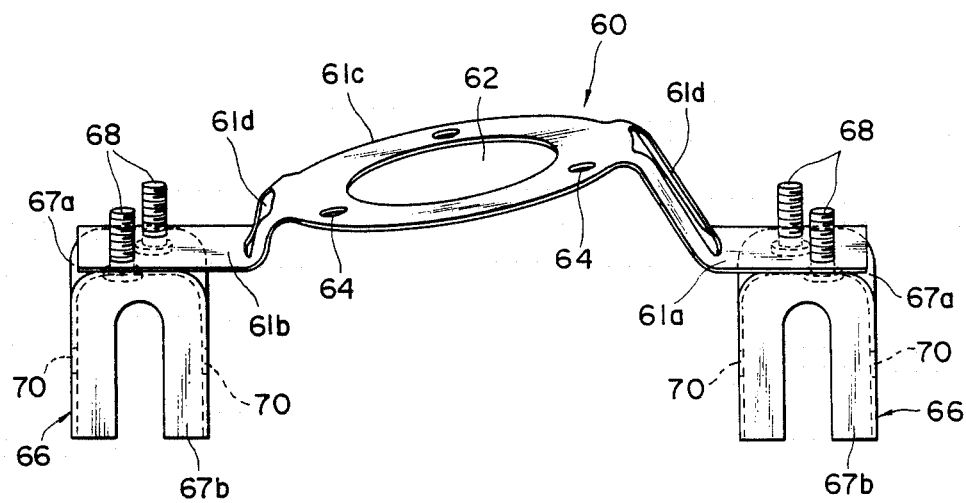
FIG. 4 is a front view of a bracket having a different shape from that shown in FIG. 1.
Figure 5:
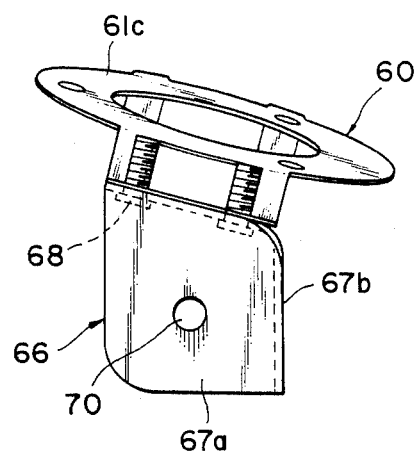
FIG. 5 is a left side view of the bracket in FIG. 4.

A bracket 60 shown in the second embodiment of FIGS. 4 and 5 has first and second lateral mounting portions 61a, 61b on both sides thereof and a third central mounting portion 61c. These mounting portions are press formed from a sheet material. Ribs 61d extend from a step portion joining the third mounting portion with the first and second mounting portions. The third mounting portion 61c is formed in a ring-shape having a central hole 62 and three holes 64 though each of which a bolt for connecting the bracket 60 with the shock absorber extends. A support (not shown) similar to that of the first embodiment and including a rubber bushing is disposed between the bracket 60 and the shock absorber.

The bracket 60 has a pair of mounting members 66, each having first and second portions 67a, 67b formed of a sheet material. The first portion 67a is bent in U-shape and formed flat at its top. The second portion 67b is a flat U-shape sheet and is welded to the first portion 67a. Two bolts 68 extend through the first portion 67a of each of the mounting members 66 and are press fitted in the respective mounting portion of the bracket 60 facing the flat top of the first portion 67a.

The first portion 67a of the mounting member 66 has holes 70 on its sides. The eye 26 of the arm portion of the upper arm 12 is disposed in a space defined by the parallel legs of the U-shaped first portion 67a. A bolt extends through the eye 26 and the holes 70 and a nut is screwed onto the bolt. Thus, the upper arm 12 is connected to the bracket 60. After the shock absorber and upper arm are connected with the bracket 60, the bracket 60 is mounted on the car body through the four bolts 68.

In the aforementioned embodiments, the upper arm 12 has two arm portions 13b, 13c spaced in front and to the rear of each other. Instead, a so-called I type arm like the lower arm 28 in FIG. 3 may be used as an upper arm. In this case, the bracket 20 has only one mounting portion for the upper arm.

The coil spring 16 may be disposed independently of the shock absorber 14. In this case, the upper end of the coil spring 16 is pressed not on the bracket but on the car body.

Obviously, numerous modifications and variations of the present invention are possible in light of the above teachings, it is therefore to be understood that within the scope of the appended claims, the invention may be practiced otherwise than as specifically described herein.

What is claimed as new and desired to be secured by Letters Patent of the United States is:

1. A mounting structure for mounting to a body of a vehicle a shock absorber and an upper arm connected to a wheel support means, comprising:

a bracket having bolts and means holding said bolts in place on said bracket so as to extend upwardly therefrom for fixing said bracket to a vehicle body, said bracket being a formed piece of sheet material having a central portion and at least one outward portion disposed outwardly of the central portion;

means for connecting said shock absorber to said central portion of the bracket; and means for pivotally connecting an end of said upper arm opposite said wheel support means to said outward portion of the bracket, whereby said shock absorber and upper arm are connected to said vehicle body via said bracket, said bolts comprising means for attaching said bracket, with said shock absorber and upper arm connected thereto, to the vehicle body by the insertion of said bolts from the underside of the vehicle body into holes provided in the vehicle body and by the threading of nuts onto the bolts.

2. The mounting structure of claim 1 wherein said means for pivotally connecting said end of said upper arm to said bracket comprise:

a substantially U-shaped mounting member fixed to said outward portion of said bracket;

eye means formed in said end of said upper arm; and a bolt pivotally connecting said eye means to said mounting member.

3. The mounting structure of claim 1 wherein said means for connecting said shock absorber to said bracket comprises a resilient bushing.

4. A mounting structure for mounting to a body of a vehicle a shock absorber, an upper arm having a connecting portion receiving a wheel support means and a pair of arm portions spaced from one another in a longitudinal direction of said vehicle and extending from the connecting portion, and a coil spring surrounding the shock absorber, the shock absorber and the coil spring being disposed in a space between the arm portions, said mounting structure comprising:
- a bracket having bolts for fixing said bracket to said vehicle body, said bracket being a formed piece of sheet material having a central portion and two outward portions disposed outwardly of the central portion;
- means for connecting said shock absorber to said central portion of the bracket; and
- means for pivotally connecting an end of each arm portion of said upper arm opposite said wheel support means to respective ones of said outward portions of said bracket,
- wherein an upper end of said coil spring is received by said bracket, and whereby said shock absorber and upper arm are connected to said vehicle body via said bracket.

5. A mounting structure as claimed in claim 4, wherein said coil spring abuts against the bracket through a rubber bushing.

6. In a vehicle suspension having a shock absorber, an upper arm, a lower arm, a wheel support means connected to the upper and lower arms and a subframe pivotally supporting the lower arm, a mounting structure for mounting the shock absorber and upper arm to a body of the vehicle, comprising:
- a bracket having bolts and means holding said bolts in place on said bracket so as to extend upwardly therefrom for fixing said bracket to a vehicle body, said bracket being a formed piece of sheet material having a central portion and at least one outward portion disposed outwardly of the central portion;
- means for connecting said shock absorber to said central portion of the bracket; and
- means for pivotally connecting an end of said upper arm opposite said wheel support means to said outward portion of the bracket,
- wherein said bracket, said shock absorber, said wheel support means, said upper and lower arms and said subframe are constructed as a subassembly before being incorporated into the vehicle body and wherein said upper arm and said shock absorber are connected to said vehicle body via said bracket, said bolts comprising means for attaching said bracket, with said shock absorber and upper arm connected thereto, to the vehicle body by the insertion of said bolts from the underside of the vehicle body into holes provided in the vehicle body and by the threading of nuts onto the bolts.

7. The mounting structure of claim 6, further comprising a coil spring surrounding said shock absorber and disposed below said bracket.

8. A method for assembling a vehicle suspension to a vehicle body, comprising the steps of:
- providing a bracket having bolts and means holding said bolts in place on said bracket so as to extend upwardly therefrom;
- connecting an upper suspension arm, a coil spring and a shock absorber to said bracket; thereafter,
- moving said bracket, said upper suspension arm, said coil spring and said shock absorber as a unit toward a vehicle body and inserting said bolts from the underside of the vehicle body into holes provided in the vehicle body; and
- fixing said bracket to the vehicle body by threading nuts onto said bolts, whereby said shock absorber and upper arm are connected to said vehicle body via said bracket.

9. The method of claim 8, further including the steps of connecting a wheel support means to said upper suspension arm and to a lower suspension arm pivotally mounted to a subframe, and connecting the shock absorber to the lower suspension arm, to form a subassembly before said step of fixing said bracket to said vehicle body.

* * * * *